United States Patent
Malwitz et al.

(10) Patent No.: US 10,272,891 B2
(45) Date of Patent: Apr. 30, 2019

(54) COMPLIANT TORQUE COUPLER FOR A DUAL ACTING PLUNGER ASSEMBLY OF A VEHICLE BRAKE SYSTEM

(71) Applicant: Kelsey-Hayes Company, Livonia, MI (US)

(72) Inventors: Daniel Ryan Malwitz, Carleton, MI (US); Blaise J. Ganzel, Ann Arbor, MI (US); Gregory P. Campau, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 15/221,648

(22) Filed: Jul. 28, 2016

(65) Prior Publication Data

US 2018/0029575 A1 Feb. 1, 2018

(51) Int. Cl.
  *F16D 65/14* (2006.01)
  *B60T 8/40* (2006.01)
  *B60T 8/44* (2006.01)
  *F16D 125/36* (2012.01)

(52) U.S. Cl.
  CPC ............ *B60T 8/4018* (2013.01); *B60T 8/441* (2013.01); *F16D 65/14* (2013.01); *F16D 2125/36* (2013.01)

(58) Field of Classification Search
  CPC .......... B60T 13/74; B60T 13/745; F16D 3/74; F16H 25/2021
  See application file for complete search history.

(56) References Cited

U.S. PATENT DOCUMENTS

| | | | | |
|---|---|---|---|---|
| 5,058,445 A | * | 10/1991 | Nilsson | F16D 51/02 74/411.5 |
| 5,201,851 A | * | 4/1993 | Holmstrom | F04B 13/00 417/415 |
| 5,438,888 A | * | 8/1995 | Dickhoff | F16H 25/2003 74/441 |
| 5,667,283 A | * | 9/1997 | Drennen | B60T 8/00 303/115.2 |
| 6,024,422 A | * | 2/2000 | Drennen | B60T 8/00 303/115.2 |
| 6,073,505 A | * | 6/2000 | Yuda | F16D 3/06 403/340 |
| 6,079,797 A | | 6/2000 | Ganzel | |
| 6,311,576 B1 | * | 11/2001 | Pletschet | F16H 25/2009 74/441 |
| 6,490,942 B1 | * | 12/2002 | Meyer | B60N 2/1615 297/344.14 |
| 7,562,594 B2 | * | 7/2009 | Nagai | F16H 25/2015 188/129 |
| 8,443,685 B2 | * | 5/2013 | Wu | F16H 25/2021 74/89.26 |
| 8,656,798 B2 | * | 2/2014 | Kawahara | F16H 25/20 74/89.32 |

(Continued)

*Primary Examiner* — Bradley T King
(74) *Attorney, Agent, or Firm* — MacMillan, Sobanski & Todd, LLC

(57) ABSTRACT

A vehicle brake system includes a dual acting plunger assembly. The dual acting plunger assembly comprises a housing, an anti-rotation tube secured to a ball screw assembly, and a torque coupler. The torque coupler is attached between the housing and anti-rotation tube, wherein the torque coupler allows rotation between the housing and the anti-rotation tube.

19 Claims, 5 Drawing Sheets

(56) References Cited

U.S. PATENT DOCUMENTS 8,893,627 B2 * 11/2014 Hwu ..................... F16H 25/20
108/20
9,321,444 B2 4/2016 Ganzel

* cited by examiner

COMPLIANT TORQUE COUPLER FOR A DUAL ACTING PLUNGER ASSEMBLY OF A VEHICLE BRAKE SYSTEM

BACKGROUND OF THE INVENTION

This invention relates in general to vehicle brake systems and in particular to a compliant torque coupler for use with a dual acting plunger assembly of such vehicle brake systems.

An automotive vehicle typically includes a hydraulic brake system for slowing and stopping the vehicle. The brake system typically includes a brake pedal operated by a driver of the vehicle, a master cylinder that generates hydraulic brake pressure when the brake pedal is depressed by the driver, and fluid conduits arranged in brake circuits that carry the brake pressure to wheel brakes. The brake system also typically includes a brake booster which increases the brake pressure generated by the master cylinder when the brake pedal is depressed.

The brake system may also include an anti-lock braking system (ABS) that monitors wheel rotation and selectively applies and relieves the brake pressure to maintain wheel speed and achieve maximum braking force. The ABS includes control valves for the purpose of applying and relieving the brake pressure—i.e., the control valves allow selective brake actuation. The selective brake actuation allowed by the control valves may also be used to implement an electronic stability control (ESC) system to improve vehicle stability.

An integrated brake control (IBC) system may be used to replace the ESC system along with the vacuum booster and any associated components such as cables, sensors, switches, electronic controllers, and vacuum pumps with a single integrated unit. The IBC system uses a dual acting plunger (DAP) assembly for a second source of brake pressure, independent from the master cylinder. Pressure generated by the DAP assembly may provide the ESC system functionality. The DAP assembly generates the hydraulic pressure using a ball screw assembly driven by an electric motor.

As is known to those skilled in the art, the ball screw assembly produces translational movement because of an external rotational restraint. For example, the rotational restraint may be a tab on the ball nut assembly inserted into a slot in a housing of the DAP assembly. However, the tab in slot restraint produces noise, vibration, and harshness when the motor reverses direction or is parked, pressure spikes in the ABS, or a sudden pressure release occurs. Therefore it would be desirable to have a DAP assembly with reduced noise, vibration, and harshness.

SUMMARY OF THE INVENTION

This invention relates to vehicle brake systems and in particular to a compliant torque coupler for use with a dual acting plunger assembly of such vehicle brake systems.

According to one embodiment, a dual acting plunger assembly for a vehicle brake system may comprise, individually and/or in combination, one or more of the following features: a housing, an anti-rotation tube secured to a ball screw assembly, and a torque coupler. The torque coupler is attached between the housing and the anti-rotation tube and allows rotation between the housing and the anti-rotation tube.

According to another embodiment, a dual acting plunger assembly for a vehicle brake system may comprise, individually and/or in combination, one or more of the following features: a housing, an anti-rotation tube secured to a ball screw assembly, and a torque coupler. The torque coupler has a first ring attached to the housing, a second ring attached to the anti-rotation tube, and an elastomer tube secured between the first and second rings.

According to another embodiment, a ball screw assembly for a vehicle brake system may comprise, individually and/or in combination, one or more of the following features: a first rod having a threaded portion, a threaded second rod, an anti-rotation tube, and a torque coupler attached to the anti-rotation tube. The first rod is supported on the second rod. The anti-rotation tube restrains the first rod from rotating. The torque coupler allows rotation between the torque coupler and the anti-rotation tube.

A potential advantage of an embodiment is reduced noise, vibration, and harshness for a dual acting plunger assembly. Other advantages of this invention will become apparent to those skilled in the art from the following detailed description of the preferred embodiment, when read in light of the accompanying drawing.

DETAILED DESCRIPTION OF THE PREFERRED EMBODIMENTS

Figure 1:
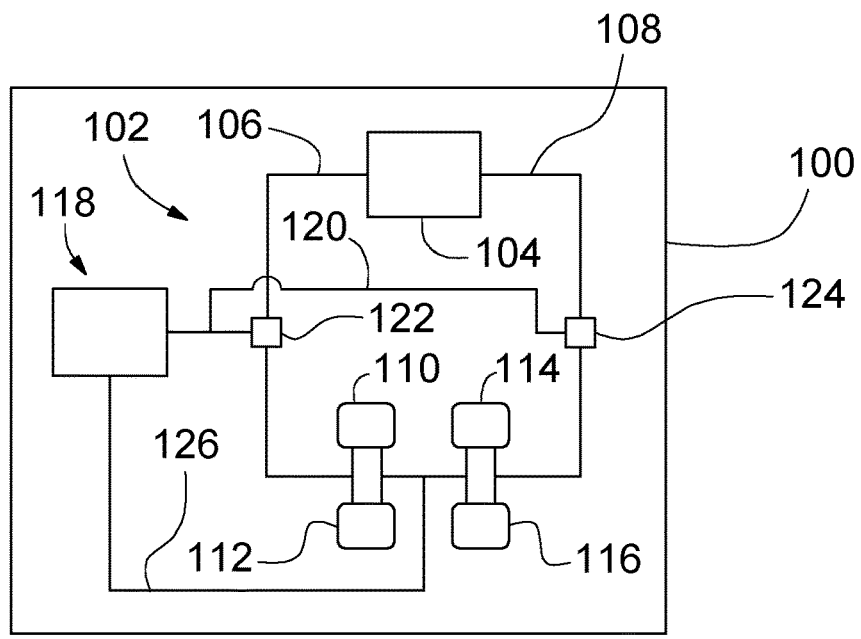
FIG. 1 is a schematic view of a vehicle brake system with a dual acting plunger assembly in accordance with the present invention.

Referring now to FIG. 1, there is schematically illustrated a vehicle 100 having a vehicle brake system, indicated generally at 102. The brake system 102 may be an integrated brake control (IBC) system. The general structure and operation of the brake system 102 are conventional in the art. Thus, only those portions of the brake system 102 which are necessary for a full understanding of this invention will be explained in detail. For example, the brake system 102 may be as disclosed in U.S. Pat. No. 9,321,444 to Ganzel, the disclosure of which is hereby incorporated by reference in entirety herein.

The brake system 102 includes a brake pedal unit or master cylinder 104. The brake pedal unit 104 supplies brake pressure to first and second brake circuits 106 and 108, respectively. The first brake circuit 106 carries the brake pressure to a first brake assembly 110 for a left rear wheel of the vehicle 100 and a second brake assembly 112 for a right front wheel of the vehicle 100. The second brake circuit 108 carries the brake pressure to a third brake assembly 114 for a right rear wheel of the vehicle 100 and a fourth brake assembly 116 for a left front wheel of the vehicle 100. Each of the first, second, third, and fourth brake assemblies 110, 112, 114, and 116, respectively, includes a wheel brake such as a disc brake assembly as well as suitable control valves for applying brake pressure to the wheel brake, isolating the wheel brake, and relieving brake pressure from the wheel brake.

The brake system 102 further includes a dual acting plunger (DAP) assembly, indicated generally at 118. The plunger assembly 118 may be, for example, similar to as disclosed in U.S. Pat. No. 6,079,797 to Ganzel, the disclosure of which is hereby incorporated by reference in entirety herein. A supply line 120 connects the plunger assembly 118 to the first brake circuit 106 by a first valve 122 and to the second brake circuit 108 by a second valve 124. A return line 126 connects the plunger assembly 118 to the first, second, third, and fourth brake assemblies 110, 112, 114, and 116, respectively, for releasing brake pressure from the first, second, third, and/or fourth brake assemblies 110, 112, 114, and 116, respectively. The plunger assembly 118 generates brake pressure for braking of the vehicle 100 as well as for anti-lock braking system (ABS) or electronic stability control (ESC) functions of the brake system 102.

Figure 2:
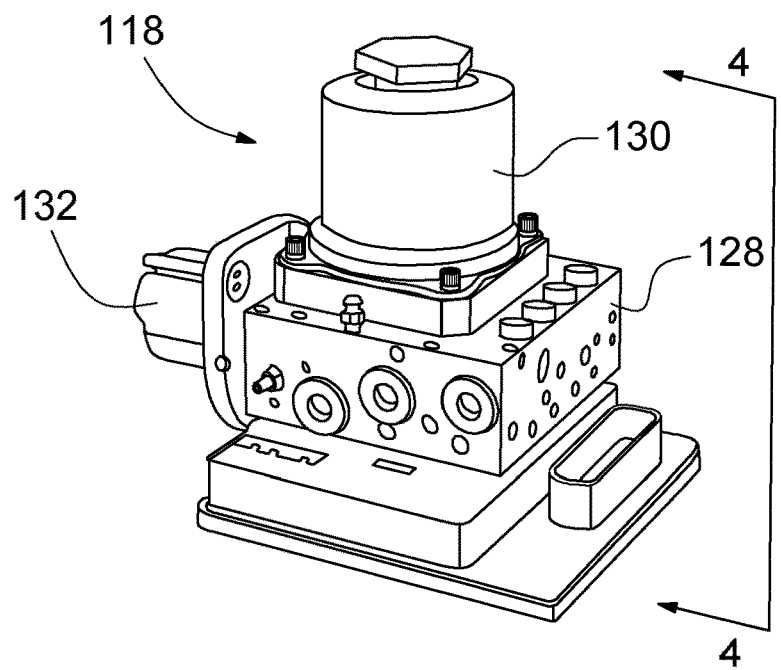
FIG. 2 is a perspective view of the plunger assembly illustrated in FIG. 1.
Figure 3:
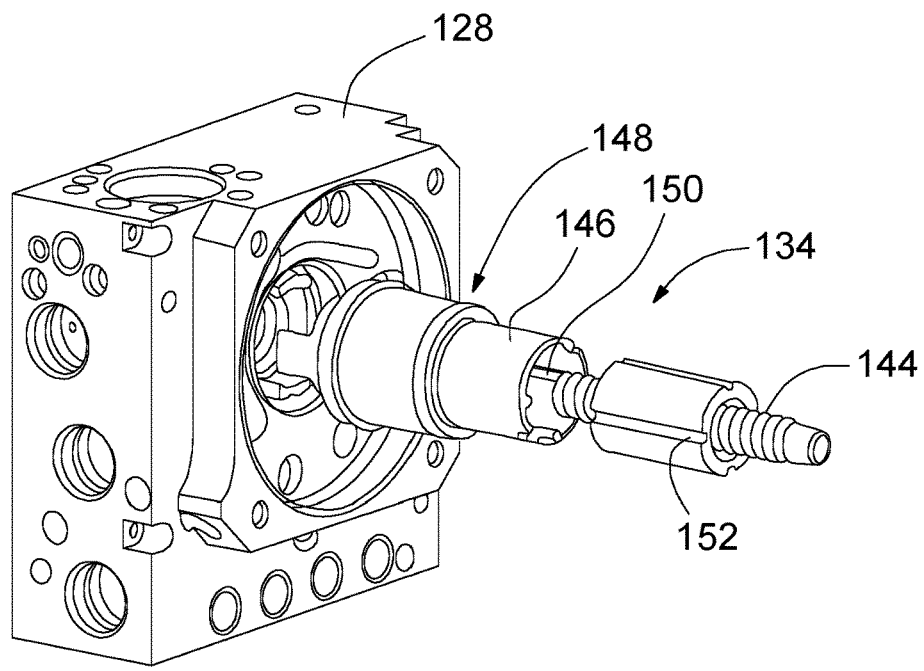
FIG. 3 is a partial, exploded perspective view of a first embodiment of a torque coupler for use with the plunger assembly of FIG. 1.
Figure 4:
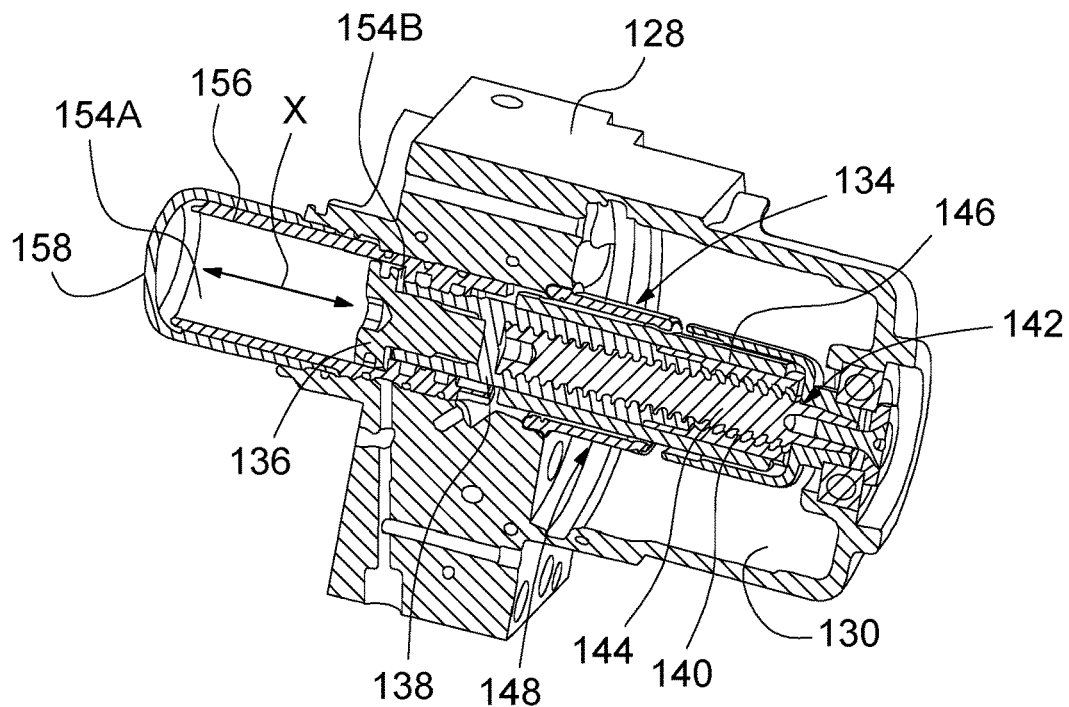
FIG. 4 is a section view taken along line 4-4 of FIG. 2.

Referring now to FIGS. 2-4, the plunger assembly includes an output housing 128, an electric motor 130, and an input housing 132. Supported on the housing 128 is a plunger, indicated generally at 134. The plunger 134 may be dual acting and includes a plunger head 136 attached to a rod 138. The rod 138 has a threaded portion 140. A ball screw assembly, indicated generally at 142, operates as known to those skilled in the art. The ball screw assembly 142 includes a threaded rod 144, ball bearings (not illustrated) between the threaded portion 140 and threaded rod 144 such that the threaded portion 140 is supported on the threaded rod 144. An anti-rotation tube 146 is supported on the housing 128 by a torque coupler, indicated generally at 148. The torque coupler 148 is attached or secured between the housing 128 and anti-rotation tube 146. For example, the torque coupler 148 may be press fit to each of the housing 128 and anti-rotation tube 146.

The anti-rotation tube 146 restrains the threaded portion 140 from rotation. The anti-rotation tube 146 has internal ridges 150 corresponding to slots 152 on the threaded portion 140. When the ridges 150 are inserted in the slots 152, the rod 138 is restrained from rotating. As such, when the threaded rod 144 is driven or rotated by the motor 130, the head 136 and rod 138 move or translate in a first direction X. As illustrated, the plunger 134 is in an unactuated, rightward position. As the motor 130 drives the threaded rod 144, the head 136 moves between the rightward position and a leftward position (not illustrated).

The movement of the plunger 134 pressurizes brake fluid in first and second annular chambers 154A and 154B, respectively, such that brake pressure is generated for the brake system 102. The first chamber 154A is defined by the head 136, a sleeve 156, and an end cap 158 and the second chamber 154B is defined between the head 136, rod 138, and sleeve 156. Typically, the first and second chambers 154A and 154B, respectively, are hydraulically linked. Pressure in the first and second chambers 154A and 154B, respectively, rises as the plunger 134 moves away from the motor 130 and falls as the plunger 134 moves toward the motor 130. During events such as slip control, the first and second chambers 154A and 154B, respectively, may be hydraulically isolated when the plunger 134 is moving towards the motor 130. When the first and second chambers 154A and 154B, respectively, are isolated, pressure in the second chamber 154B rises and fluid from a reservoir (not shown) flows into the first chamber 154A.

Figure 5:
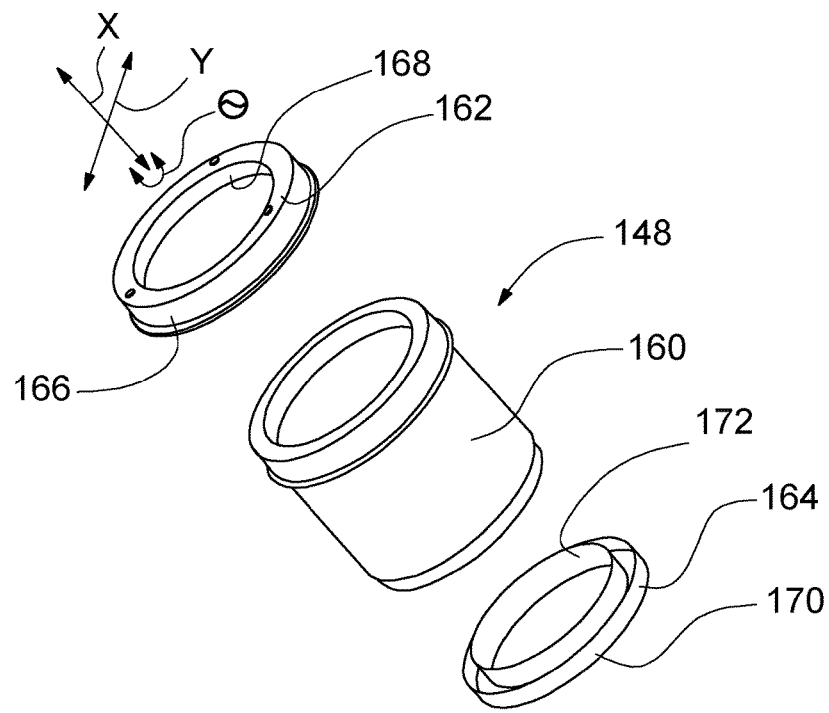
FIG. 5 is an exploded perspective view of the torque coupler illustrated in FIG. 2.

Referring now to FIG. 5, there is illustrated in detail the torque coupler 148. The torque coupler 148 comprises a tube 160 secured between first and second rings 162 and 164, respectively. The tube 160 is continuous and is preferably fabricated from a single elastomer material. For example, the tube 160 may be non-fiber reinforced EPDM rubber. The first and second rings 162 and 164, respectively, are preferably metallic. The first ring 162 has a first outside annular surface 166 and a first inside annular surface 168. The first outside annular surface 166 is attached to the housing 128. The second ring 164 has a second outside annular surface 170 and a second inside annular surface 172. The second inside annular surface 172 is attached to an outside diameter of the anti-rotation tube 146. The second inside annular surface 172 is attached to the anti-rotation tube 146 such that there is an air space between the anti-rotation tube 146 and torque coupler 148. The torque coupler 148 is formed by over-molding the rubber material of the tube 160 onto the first and second rings 162 and 164, respectively, such that the tube 160 is secured between the first and second rings 162 and 164, respectively.

The torque coupler 148 provides lateral and torsional compliance between the first and second rings 162 and 164, respectively, such that the first and second rings 162 and 164, respectively, may move laterally relative to each other in a side-to-side second direction Y perpendicular to the first direction X and rotate relative to each other in a direction $\theta$ about the first direction X. For example, the first and second rings 162 and 164, respectively, may rotate relative to each other when the motor 130 reverses direction, the motor 130 is parked, or when the brake system 102 experiences a pressure spike or release. The torque coupler 148 provides torsional compliance in both rotational directions—i.e., clockwise and counterclockwise—of the threaded rod 144.

Figure 6:
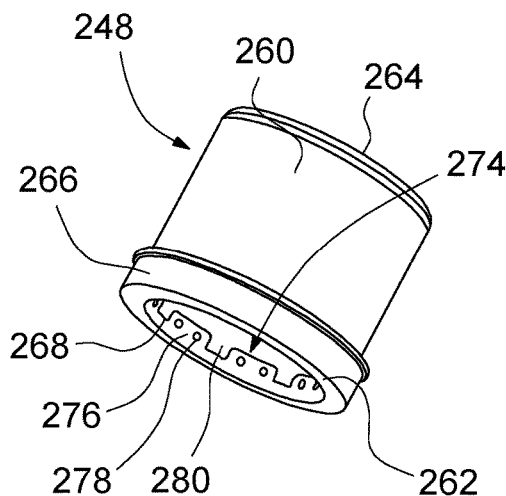
FIG. 6 is a perspective view of a second embodiment of a torque coupler for use with the plunger assembly illustrated in FIG. 2.

Referring now to FIG. 6, there is illustrated a second embodiment of a torque coupler, indicated generally at 248, for use with the plunger assembly 118 illustrated in FIGS. 1-5. The torque coupler 248 is a variation of the torque coupler 148 of FIGS. 1-5. As such, like reference numerals, increased by 100, designate corresponding parts in the drawings and detailed description thereof will be omitted.

The torque coupler 248 has a tube 260 secured between first and second rings 262 and 264, respectively. The first ring 262 has a specific repeating geometry, indicated generally at 274, to improve over-molding of tube 260 onto the first ring 262. Specifically, the first ring 262 has a pattern of tabs 276, holes 278, and generally rectangular notches 280 in a first inside annular surface 268.

Figure 7:
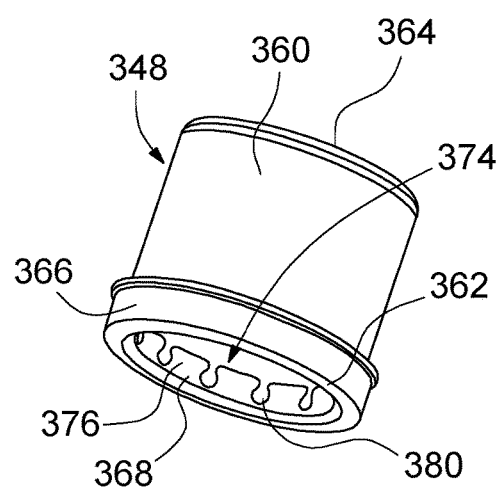
FIG. 7 is a perspective view of a third embodiment of a torque coupler for use with the plunger assembly illustrated in FIG. 2.

Referring now to FIG. 7, there is illustrated a third embodiment of a torque coupler, indicated generally at 348, for use with the plunger assembly 118 illustrated in FIGS. 1-5. The torque coupler 348 is a variation of the torque coupler 148 of FIGS. 1-5. As such, like reference numerals, increased by 200, designate corresponding parts in the drawings and detailed description thereof will be omitted.

The torque coupler 348 has a tube 360 secured between first and second rings 362 and 364, respectively. The first ring 362 has a specific repeating geometry, indicated generally at 374, to improve over-molding of the tube 360 onto the first ring 362. Specifically, the first ring 362 has a pattern of tabs 376 and key shaped notches 380 in a first inside annular surface 368.

Figure 8:
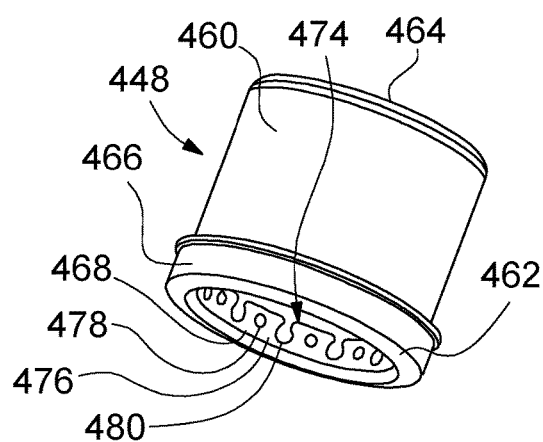
FIG. 8 is a perspective view of a fourth embodiment of a torque coupler for use with the plunger assembly illustrated in FIG. 2.

Referring now to FIG. 8, there is illustrated a fourth embodiment of a torque coupler, indicated generally at 448, for use with the plunger assembly 118 illustrated in FIGS. 1-5. The torque coupler 448 is a variation of the torque coupler 148 of FIGS. 1-5. As such, like reference numerals, increased by 300, designate corresponding parts in the drawings and detailed description thereof will be omitted.

The torque coupler 448 has a tube 460 between first and second rings 462 and 464, respectively. The first ring 462 has a specific repeating geometry, indicated generally at 474, to improve over-molding of the tube 460 onto the first ring 462. Specifically, the first ring 462 has a pattern of tabs 476, holes 478, and key shaped notches 480 in a first inside annular surface 468.

Figure 9:
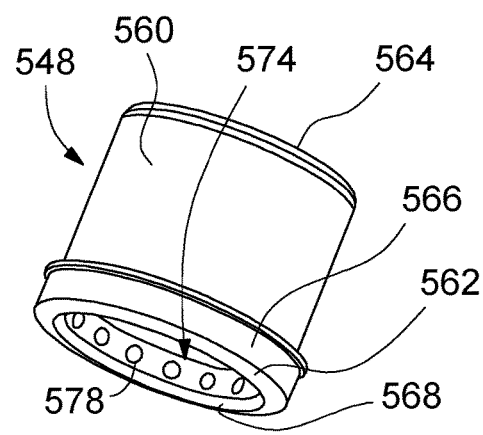
FIG. 9 is a perspective view of a fifth embodiment of a torque coupler for use with the plunger assembly illustrated in FIG. 2.

Referring now to FIG. 9, there is illustrated a fifth embodiment of a torque coupler, indicated generally at 548, for use with the plunger assembly 118 illustrated in FIGS. 1-5. The torque coupler 548 is a variation of the torque coupler 148 of FIGS. 1-5. As such, like reference numerals, increased by 400, designate corresponding parts in the drawings and detailed description thereof will be omitted.

The torque coupler 548 has a tube 560 between first and second rings 562 and 564, respectively. The first ring 562 has a specific repeating geometry, indicated generally at 574, to improve over-molding of the tube 560 onto the first ring 562. Specifically, the first ring 562 has a pattern of holes 578 in a first inside annular surface 568.

Figure 10:
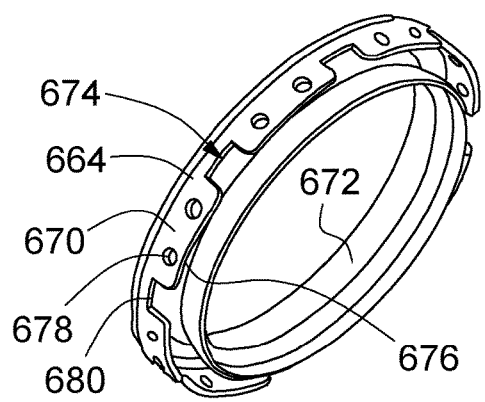
FIG. 10 is a perspective view of a ring for a sixth embodiment of a torque coupler for use with the plunger assembly illustrated in FIG. 2.

Referring now to FIG. 10, there is illustrated a second ring 664 for use with a sixth embodiment of a torque coupler for use with the plunger assembly 118 illustrated in FIGS. 1-5. The second ring 664 is a variation of the second ring 164 of FIGS. 1-5. As such, like reference numerals, increased by 500, designate corresponding parts in the drawings and detailed description thereof will be omitted.

The second ring 664 has a specific repeating geometry, indicated generally at 674, to improve over-molding onto the second ring 664. Specifically, the second ring 664 has a pattern of tabs 676, holes 678, and generally rectangular notches 680 in a second outside annular surface 670.

Figure 11:
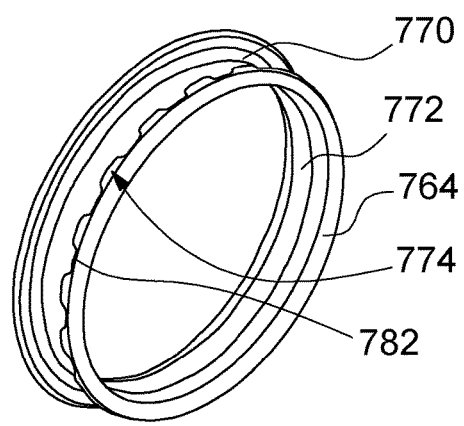
FIG. 11 is a perspective view of a ring for a seventh embodiment of a torque coupler for use with the plunger assembly illustrated in FIG. 2.

Referring now to FIG. 11, there is illustrated a second ring 764 for use with a seventh embodiment of a torque coupler for use with the plunger assembly 118 illustrated in FIGS. 1-5. The second ring 764 is a variation of the second ring 164 of FIGS. 1-5. As such, like reference numerals, increased by 600, designate corresponding parts in the drawings and detailed description thereof will be omitted.

The second ring 764 has a specific repeating geometry, indicated generally at 774, to improve over-molding onto the second ring 764. Specifically, the second ring 764 has a pattern of folded over portions 782 in a second outside annular surface 770.

Figure 12:
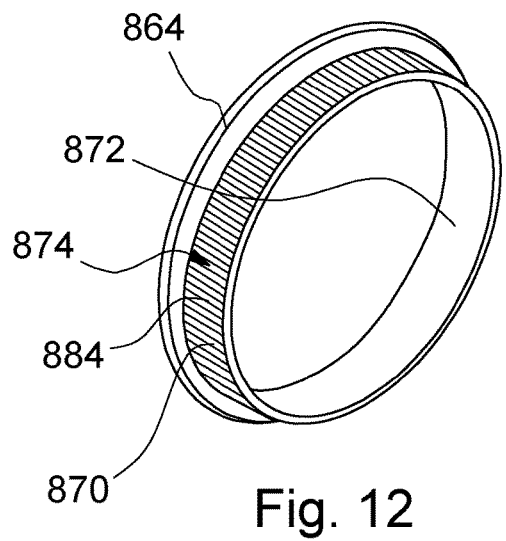
FIG. 12 is a perspective view of a ring for an eighth embodiment of a torque coupler for use with the plunger assembly illustrated in FIG. 2.

Referring now to FIG. 12, there is illustrated a second ring 864 for use with a eighth embodiment of a torque coupler for use with the plunger assembly 118 illustrated in FIGS. 1-5. The second ring 864 is a variation of the second ring 164 of FIGS. 1-5. As such, like reference numerals, increased by 700, designate corresponding parts in the drawings and detailed description thereof will be omitted.

The second ring 864 has a specific repeating geometry, indicated generally at 874, to improve over-molding over the second ring 864. Specifically, the second ring 864 has a pattern of knurling 884 in a second outside annular surface 870.

Figure 13:
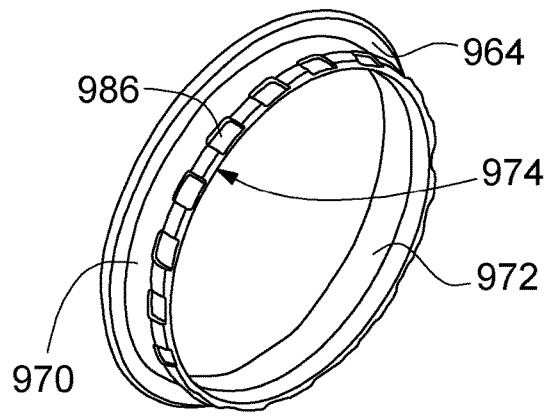
FIG. 13 is a perspective view of a ring for a ninth embodiment of a torque coupler for use with the plunger assembly illustrated in FIG. 2.

Referring now to FIG. 13, there is illustrated a second ring 964 for use with a ninth embodiment of a torque coupler for use with the plunger assembly 118 illustrated in FIGS. 1-5. The second ring 964 is a variation of the second ring 164 of FIGS. 1-5. As such, like reference numerals, increased by 800, designate corresponding parts in the drawings and detailed description thereof will be omitted.

The second ring 964 has a specific repeating geometry, indicated generally at 974, to improve over-molding onto the second ring 964. Specifically, the second ring 964 has a pattern of flat portions 986—i.e., a "coin" effect—in a second outside annular surface 970.

Figure 14:
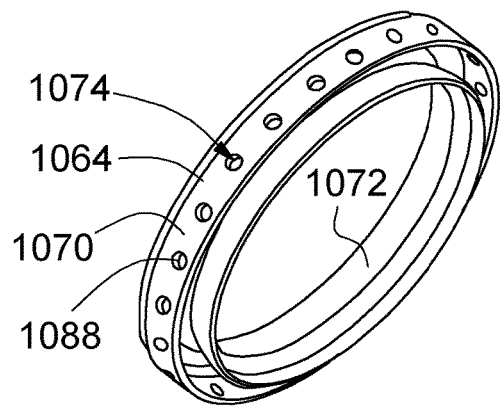
FIG. 14 is a perspective view of a ring for a tenth embodiment of a torque coupler for use with the plunger assembly illustrated in FIG. 2.

Referring now to FIG. 14, there is illustrated a second ring 1064 for use with a tenth embodiment of a torque coupler for use with the plunger assembly 118 illustrated in FIGS. 1-5. The second ring 1064 is a variation of the second ring 164 of FIGS. 1-5. As such, like reference numerals, increased by 900, designate corresponding parts in the drawings and detailed description thereof will be omitted.

The second ring 1064 has a specific repeating geometry, indicated generally at 1074, to improve over-molding onto the second ring 1064. Specifically, the second ring 1064 has a pattern of holes 1088 in a second outside annular surface 1070.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A reversible plunger assembly for a vehicle brake system, the reversible plunger assembly comprising:
   a housing;
   an anti-rotation tube secured to a ball screw assembly;
   a torque coupler attached between the housing and the anti-rotation tube, wherein the torque coupler allows rotation between the housing and the anti-rotation tube;
   wherein the torque coupler has:
      a first ring attached to the housing;
      a second ring attached to the anti-rotation tube; and
      an elastomer tube secured between the first and second rings.

2. The reversible plunger assembly of claim 1 wherein the torque coupler allows lateral movement between the housing and the anti-rotation tube.

3. The reversible plunger assembly of claim 1 wherein the elastomer tube is over-molded onto the first and second rings.

4. The reversible plunger assembly of claim 3 further comprising:
   tabs, holes, or notches in the first ring, wherein the elastomer tube is over-molded onto the tabs, holes, or notches.

5. The reversible plunger assembly of claim 3 further comprising:
   flat portions, knurling, folded portions, or holes in the second ring, wherein the elastomer tube is over-molded onto the flat portions, knurling, folded portions, or holes.

6. The reversible plunger assembly of claim 1 further comprising:
   an outside annular surface of the torque coupler, wherein the outside annular surface is attached to the housing; and
   an inside annular surface of the torque coupler, wherein the inside annular surface of the torque coupler is attached to the anti-rotation tube.

7. The reversible plunger assembly of claim 1 further comprising:
   an electric motor, wherein the electric motor drives the ball screw assembly; and
   a plunger head, wherein the actuated ball screw assembly moves the plunger head to pressurize brake fluid.

8. A reversible plunger assembly for a vehicle brake system, the reversible plunger assembly comprising:
   a housing;
   an anti-rotation tube secured to a ball screw assembly; and
   a torque coupler attached between the housing and the anti-rotation tube, wherein the torque coupler has:
     a first ring attached to the housing;
     a second ring attached to the anti-rotation tube; and
     an elastomer tube secured between the first and second rings.

9. The reversible plunger assembly of claim 8 wherein the elastomer tube allows rotation between the first and second rings.

10. The reversible plunger assembly of claim 8 wherein the elastomer tube allows lateral movement between the first and second rings.

11. The reversible plunger assembly of claim 8 wherein the elastomer tube is over-molded onto the first and second rings.

12. The reversible plunger assembly of claim 8 further comprising:
    an outside annular surface of the first ring, wherein the outside annular surface is attached to the housing; and
    an inside annular surface of the second ring, wherein the inside annular surface is attached to the anti-rotation tube.

13. The reversible plunger assembly of claim 8 wherein the first ring is press fit to the housing and the second ring is press fit to the anti-rotation tube.

14. The reversible plunger assembly of claim 8 further comprising:
    an electric motor, wherein the electric motor drives the ball screw assembly; and
    a plunger head, wherein the actuated ball screw assembly moves the plunger head to pressurize brake fluid.

15. A ball screw assembly for a reversible plunger assembly of a vehicle brake system, the ball screw assembly comprising:
    a first rod having a threaded portion;
    a threaded second rod, wherein the first rod is supported on the second rod;
    an anti-rotation tube restraining the first rod from rotating;
    a torque coupler attached to the anti-rotation tube;
    wherein the torque coupler has:
      a first ring;
      a second ring; and
      an elastomer tube secured between the first and second rings.

16. The ball screw assembly of claim 15 wherein the torque coupler allows lateral movement between the torque coupler and the anti-rotation tube.

17. The ball screw assembly of claim 15 further comprising:
    an inside annular surface of the second ring, wherein the inside annular surface is attached to the anti-rotation tube.

18. The ball screw assembly of claim 15 further comprising:
    an electric motor, wherein the electric motor drives the second rod; and
    a plunger head, wherein the first rod moves the plunger head in a sleeve.

19. A plunger assembly for a vehicle brake system comprising:
    a housing defining a brake fluid chamber;
    a plunger positioned in the brake fluid chamber and mounted for fore and aft movement to control brake fluid pressure in the brake system;
    a reversible motor;
    a ball screw mechanism connected between the motor and the plunger and operable to convert rotational movement of a motor shaft to translational fore and aft movement of the plunger, the ball screw mechanism including a ball screw, a nut and an anti-rotation member, one of the ball screw and nut defining a rotatable component coupled to the motor shaft and the other one of the ball screw and nut defining a non-rotatable component engageable with the anti-rotation member and coupled to the plunger; and
    a torque coupler for connecting the anti-rotation member to the housing, the torque coupler including an elastomeric element to provide torsional compliance when the motor rotation is reversed.

* * * * *